Patented Dec. 18, 1945

2,391,299

UNITED STATES PATENT OFFICE 2,391,299

HERBICIDE

Colton De Laney, Berkeley, Calif., assignor to California Spray-Chemical Corporation, Richmond, Calif., a corporation of Delaware No Drawing. Application April 22, 1941, Serial No. 389,748

6 Claims. (Cl. 167—45)

This invention relates to an improved herbicidal composition of a type adapted primarily to kill vegetation by means of root absorption. Such herbicides destroy the root systems of plants and sterilize the soil, preventing new seedling growth. Among the desired qualities in such preparations are mobility and deep penetration within the soil, prolonged effectiveness, and the possibility of eventual recovery of the soil to a normal condition.

It is the object of my invention to provide a herbicidal composition possessing these qualities in higher degree than in conventional compositions now in use.

It is also the object of my invention to provide a herbicide which is noninflammable and which will render dried vegetation and wood fire resistant.

A further object is to provide a composition which is noncorrosive to metals and which will render them more resistant to rusting. These properties are obviously important in many of the situations where weed killers are used, for example in lumber yards, around telephone poles, on railroad tracks and around pipe lines.

Among the various preparations which have been used both as soil sterilants and for the purpose of withering foliage is the well-known class utilizing some form of arsenic as the toxic ingredient. It is to this class of preparations that my invention principally relates.

Briefly stated, I have discovered that arsenical soil sterilizers are materially improved by the incorporation therein of a quantity of sodium silicate. One effect of the silicate in conjuction with the arsenic solution is to afford deeper soil penetration of the herbicide, thus making it effective against a wider range of plants than heretofore obtained with conventional arsenical solutions. It also increases the amount of available arsenic stored in the soil, decreasing the amount of permanently fixed arsenic and thus makes possible a more nearly normal ultimate recovery of the soil from the arsenical sterilization.

I have found by large scale experience that soils treated with arsenical preparations containing the proper amount of sodium silicate, as more fully discussed below, have remained sterile from two to three times as long as similar soils which have been treated with arsenical solutions containing no sodium silicate but otherwise the same.

The sodium silicate which I ordinarily use in making my improved solution is the ordinary "N brand" the gravity of which is about 41° Baumé, having an alkali-silica ratio of approximately 1 to 3.22.

I have found that, in order to obtain a soil sterilant having the improved properties mentioned, the solution as applied to the soil should contain at least 0.4 pound of this sodium silicate per 300 square feet of soil treated. I prefer to use from 0.5 to 1.0 pound of sodium silicate to 300 square feet of soil. Higher concentrations, up to 4 pounds per 300 square feet, may be used with some quality improvement, but beyond 4 pounds there is little or no gain in quality.

The corresponding arsenical concentration is variable, depending on the herbicidal potency which the manufacturer desires. Satisfactory concentrations are illustrated in the examples below.

Likewise the relative amount of water used may be varied. Except for the small quantity of water required to bring the chemicals into solution, the water serves merely as a vehicle, and such amount is used as will, in the judgment of the user, make for easy and uniform application. In practice about 10 gallons of solution to 300 square feet of soil to be treated is a convenient rate.

The arsenical component of the herbicide may be varied considerably to fit the needs of the individual compounder as is well known to those skilled in the art. A common form of arsenical herbicide is that containing sodium arsenite. This is conveniently made by a water solution of "white arsenic" (arsenic trioxide, $As_2O_3$) and sodium hydroxide. The relative proportion of sodium hydroxide added varies in practice from about 20 to about 40 parts by weight of NaOH to 100 parts by weight of arsenic trioxide.

My improvement in soil sterilants as applied to a sodium arsenite type herbicide is illustrated by the following general formula:

| | Parts by weight |
|---|---|
| Arsenic trioxide $As_2O_3$ | At least 8 |
| Sodium hydroxide NaOH | At least 2 |
| Water glass, commercial | 0.4 to 4.0 |
| Water | Variable |

These ingredients are put into water solution and, for use in the field, any desired quantity of water is used to provide for easy distribution over the soil to be treated. For example, the addition of sufficient water to the above to make 100 parts by weight would give a soil sterilant suitable for field use. If this formula is made with one "part by weight" equal to one pound, it would be effective in ordinary circumstances for the treatment of about 300 square feet of soil.

It is of course convenient in practice to prepare a concentrated stock solution of the chemicals which is less bulky and which can be diluted as desired in the field. The amount of water used in the stock solution is variable at will.

The following is a specific example of one embodiment of the improved herbicidal solution of my invention, which has given excellent results:

| | Pounds |
|---|---|
| Arsenic trioxide, 99% $As_2O_3$ | 51.2 |
| Caustic soda, 50% NaOH | 28.5 |
| Sodium silicate, "N brand" | 3.5 |
| Water | 16.8 |
| | 100.0 |
| | (approx. 6 gal.) |

This formula produces a thick syrupy solution which I dilute with water for use. When used in soil sterilization treatment, i. e. to render the soil sterile to plant growth, I prefer to use a solution made by adding sufficient water to each gallon of the concentrate (formula above) to make 10 gallons of solution which is suitable for treating about 300 square feet of soil surface area. For use as a contact spray to kill annual weeds and top growth of perennial weeds I make about a 1 to 80 dilution. Intermediate dilutions may be desirable in accordance with local conditions.

More water than shown in the above concentrate formula may be used if it is desired to produce a less viscous stock solution in which case the amount of water subsequently added for the field application may be varied accordingly.

It is to be understood that the kind and concentration of arsenical compounds used may be varied as desired within the limits necessary to give herbicidal (soil sterilization) properties without losing the benefits derived from the presence of sodium silicate.

It is of course not essential that sodium silicate of the above-mentioned specification, namely "N brand," be used. If other water-glass solutions are used, the proportion in the mixture can readily be adjusted so as to provide a silicate concentrate equivalent to that described above.

I claim:

1. An aqueous herbicidal solution containing:

| | Parts by weight |
|---|---|
| Arsenic trioxide $As_2O_3$ | At least 8 |
| Sodium hydroxide NaOH | At least 2 |
| Water glass, commercial | 0.4 to 4.0 |
| Water | |

2. An aqueous herbicidal solution containing the following in the weight proportions indicated:

| | |
|---|---|
| Arsenic trioxide, 99% $As_2O_3$ | 51.2 |
| Caustic soda, 50% NaOH | 28.5 |
| Sodium silicate (water glass) "N brand" | 3.5 |

3. A herbicide concentrate consisting of the following in the proportions indicated:

| | Pounds |
|---|---|
| Arsenic trioxide, 99% $As_2O_3$ | 51.2 |
| Caustic soda, 50% NaOH | 28.5 |
| Sodium silicate, "N brand" | 3.5 |
| Water | 16.8 |

4. The method of treating soil to kill vegetation and prevent new growth therein, comprising wetting such soil with an aqueous solution containing arsenical compounds in herbicidal concentration and sodium silicate.

5. The method of treating soil to kill vegetation and render the soil sterile to plant growth, comprising wetting the soil with an aqueous arsenical solution containing water glass at such rate that the arsenical component is applied in herbicidal amount and the water glass at from 0.4 to 4.0 pounds per 300 square feet of soil surface.

6. The method of treating soil to kill vegetation and prevent new growth therein, comprising wetting such soil with a liquid comprising:

| | Parts by weight |
|---|---|
| Arsenic trioxide $As_2O_3$ | At least 8 |
| Sodium hydroxide NaOH | At least 2 |
| Water glass, commercial | 0.4 to 4.0 |
| Water to make | 100 |

COLTON DE LANEY.